United States Patent [19]

Mosher

[11] Patent Number: 4,726,434
[45] Date of Patent: Feb. 23, 1988

[54] METAL DETECTOR TESTING PROCESS AND APPARATUS IN A COMBINATION WEIGHING SYSTEM

[75] Inventor: Oren A. Mosher, Hayward, Calif.
[73] Assignee: Package Machinery Company, Longmeadow, Mass.
[21] Appl. No.: 891,196
[22] Filed: Jul. 28, 1986
[51] Int. Cl.⁴ .................. G01G 19/22; G01G 19/52
[52] U.S. Cl. .......................................... 177/25; 177/1; 177/50
[58] Field of Search ................. 177/1, 25.18, 246, 50

[56] References Cited

U.S. PATENT DOCUMENTS

4,512,253  4/1985  La Barge et al. ................. 177/50 X
4,574,897  3/1986  Minamida et al. ............... 177/25.18

*Primary Examiner*—George H. Miller, Jr.
*Attorney, Agent, or Firm*—McCormick, Paulding and Huber

[57] ABSTRACT

An apparatus for testing a metal detector is incorporated in a combination weighing system where the metal detector is located to monitor product as it passes through a discharge chute of the combination weighing machine into a package. The apparatus includes a computer programmable by an operator to initiate a metal detector test operation. Upon such initiation, the computer holds out a first one of the scales from one or more subsequent combination searches while a metal test object is deposited in a first scale. Then the computer performs a combination search of the scales to select a test combination which includes the first scale and other scales as needed to achieve the target weight, discharges the selected combination and monitors the output of the metal detector or determine if it is working. Related methods are also disclosed. A feed mechanism is optionally provided to automatically deposit a test object in the first scale in which case, the computer is programmed to periodically activate the feed mechanism and initiate a metal detector test operation.

19 Claims, 7 Drawing Figures

METAL DETECTOR TESTING PROCESS AND APPARATUS IN A COMBINATION WEIGHING SYSTEM

BACKGROUND OF THE INVENTION

The invention relates generally to weighing and packaging systems and deals more particularly with an apparatus and process for testing a metal detector installed in a combination weighing system.

In combination and noncombination weighing systems, it is possible for a piece of metal to inadvertently appear with a product being weighed. Such a piece of metal may be a metal shaving that resulted from one moving part bearing against another part or may be a metal washer or nut that came loose as a result of vibrations within the machine. Such metal pieces are usually highly objectionable, especially if the packaged product is a food product, and it is important to prevent a contaminated package from reaching the hands of a consumer.

Heretofore, a metal detector has been installed around a discharge chute of a combination weighing machine leading into a packaging machine. Weighed quantities of product pass through the metal detector, and if a metal object is detected in the product, the metal detector is activated and signals the weighing machine to halt. Unfortunately, such metal detectors are subject to failure or may need adjustment, and as a result, it is desirable to periodically test the detector.

In the past, to perform the test, operators shut down the weighing machine and dropped a small metal object into the discharge chute and noted the response if any of the metal detector. Then the operator retrieved the metal object from a package beneath the discharge chute or discarded the package. There are a few problems with this test procedure. Production is halted during the time it takes for the operator to perform the test. Also, the test is not entirely realistic because there is little control over the initial velocity at which the operator delivers the metal object to the common discharge chute and this velocity may effect the sensitivity of the metal detector. Moreover, the metal object is not surrounded by regular product so that it travels through the common discharge chute more rapidly than would be the case if it were interspersed with a measured batch of the product.

In the past, operators have also performed a metal detection test while the machine is operating by dropping a small metal test object into the discharge chute. An additional problem has arisen in this test procedure when the metal detector is not working because under such conditions, there is no automatic means for identifying the contaminated package containing the test object. With a packaging rate of 60 to 100 bags per minute, it is often difficult for the operator to locate the contaminated package. In addition, this test procedure is not altogether realistic because the operator imparts to the metal object an initial velocity which may be different than that which it would experience if it entered the discharge chute along with the packaged product.

Accordingly, a general object of the present invention is to provide an apparatus and method for testing a metal detector in a manner which simulates actual packaging conditions.

Another object of the present invention is to provide a metal testing apparatus and method which may be utilized without interrupting weighing and packaging operations.

A more specific object is to provide an apparatus and method of the foregoing type which minimize the chance that a package contaminated with a metal test object is inadvertently transported from the weighing and packaging station for shipping to a customer.

Another specific object of the present invention is to provide an apparatus and method of the foregoing type which does not cause a filled test package to be wasted.

Still another specific object of the invention is to provide an apparatus and method of the foregoing type which fully automates the testing operation.

SUMMARY OF THE INVENTION

The present invention resides in an improvement to a combination weighing and packaging system having a plurality of weighing scales, a first computer means coupled to the weighing scales for determining combinations of the scales which contain a combined quantity of product near a target weight, a common discharge chute for the weighing scales, and a metal detector positioned to monitor product as it passes through the common discharge chute. The improvement comprises second computer means programmable by an operator to initiate a metal detector test operation, third computer means responsive to the initiation of the metal detector test operation for holding a first of the scales out of at least one combination search performed by the first computer means after the metal detector test operation is initiated, and fourth computer means for forcing the first computer means to select a test combination which includes the first scale after a test object containing metal has been deposited in the first scale and the metal detector test operation has been initiated. According to one feature of the invention, a feed mechanism may be provided to automatically deposit a metal test object into a test scale in which case a fifth computer means periodically activates the second computer means to initiate a metal detector test operation.

The invention also resides in related methods for performing metal detector test operations.

DETAILED DESCRIPTION OF THE PREFERRRED EMBODIMENT

Figures 1, 4:
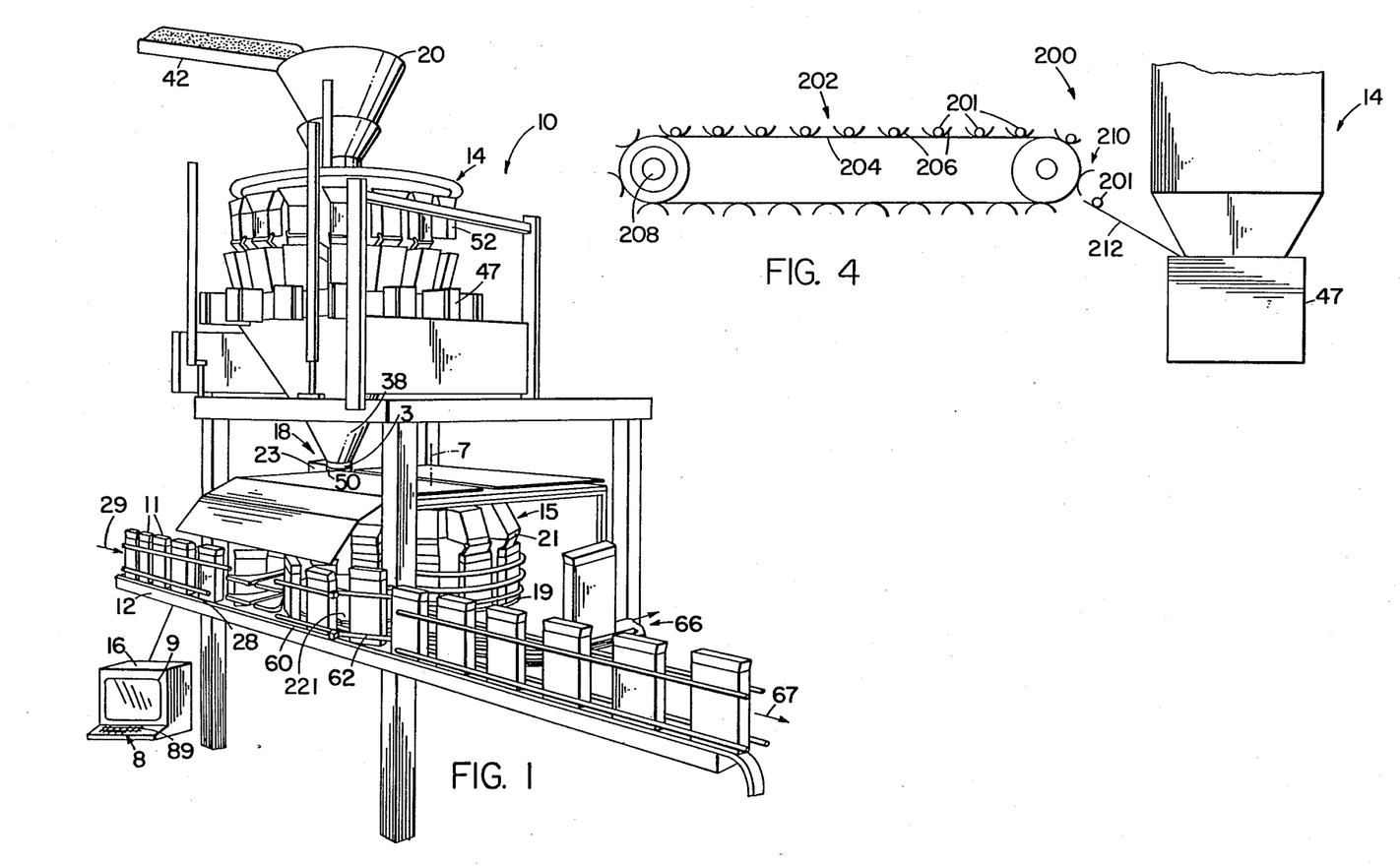
FIG. 1 is is a perspective view of a combination weighing and packaging system in which the invention is embodied.
FIG. 4 is a schematic view of a loader for automatically depositing a metal test object into a weighing scale of the combination weighing system of FIG. 1 to fully automate the metal detector testing process.

Turning now to the drawings, FIG. 1 illustrates a weighing and packaging system generally designated 10 in which the invention is embodied. The system 10 comprises a package conveyor assembly 12, a combination weighing machine 14, a rotary discharge packaging machine 15, a computer controller 16 having a keyboard 8 and a CRT or monitor 9, and a metal detector 18 mounted on the discharge chute 38 of the weighing machine.

The conveyor assembly 12 comprises a flexible conveyor belt 28 which transports empty packages 11,11 in the direction indicated by an arrow 29 toward the circular rotatable infeed wheel 222 of the packaging machine 15. The rotary discharge packaging machine includes discharge chutes 21,21 which receive product from the weighing machine 14 via the discharge chute 38 and revolve about an axis 7. The conveyor assembly 12 also includes a circular, rotatable table 19 supported beneath the rotary discharge packaging machine 15, which table has pockets spaced about its perimeter for receiving the packages 11,11 from the conveyor 28 and guiding them in a circular path about the axis 7 in synchronization with the discharge chutes 21,21 to receive a weighed batch of the product.

The combination weighing machine 14 includes weighing scales 47,47, accumulator buckets 52,52 and a product feed assembly 20. The product is delivered by a conveyor 42 to the product feed assembly which in turn delivers the product to the accumulator buckets 52,52. Beneath each accumulator bucket 52,52 is one of the weighing scales, and whenever one of the weighing scales is empty and the associated accumulator bucket has a sufficient amount of product, the associated accumulator bucket dumps its product into the weighing scale. The computer controller 16 monitors weight signals produced by the weighing scales 47,47 and searches for combinations of the scales which satisfy weight range criteria for a package. Typically, a computer selects for combination 3–5 of the weight scales out of a total of 10 or more to provide the contents of a package. Various types of combination generating methods are known for selecting a suitable combination. In one method, a binary counter generates $2^n-1$ counts from "N" output ports. Each output port of the counter represents one of the scales, and each count indicates a different combination of scales. Another combination searching process is disclosed in U.S. Pat. No. 4,466,500 to Mosher, et al in which a combination generator searches sequences of combinations of scales with certain steps in the sequences being omitted if they involve subcombinations previously searched and found to be at or above the target weight. The Mosher '500 patent is assigned to the assignee of the present invention and is adopted by reference as part of the present disclosure.

A nozzle 50 which may be made of plastic is located at the lower end of the common discharge chute 38 for the scales 47, and the metal detector 18 is located within the plastic nozzle. By way of example, the metal detector may comprise a 6½ inch inner diameter model produced by Goering Kerr of England or a similar model produced by ICORE, Inc. of Minneapolis, Minn. The metal detector comprises a cylindrical coil 3 which is electrically excited to produce a magnetic field. Whenever a piece of metal passes through the common discharge chute 38 it enters into and alters the magnetic field within the metal detector 18. If the metal detector is sensitive enough and working properly, the metal detector is activated. Once activated, the metal detector 18 activates an alarm 23 and also sends a signal to the computer controller 16 to stop the machine or identify the package 11 receiving the detected metal.

Figure 2:
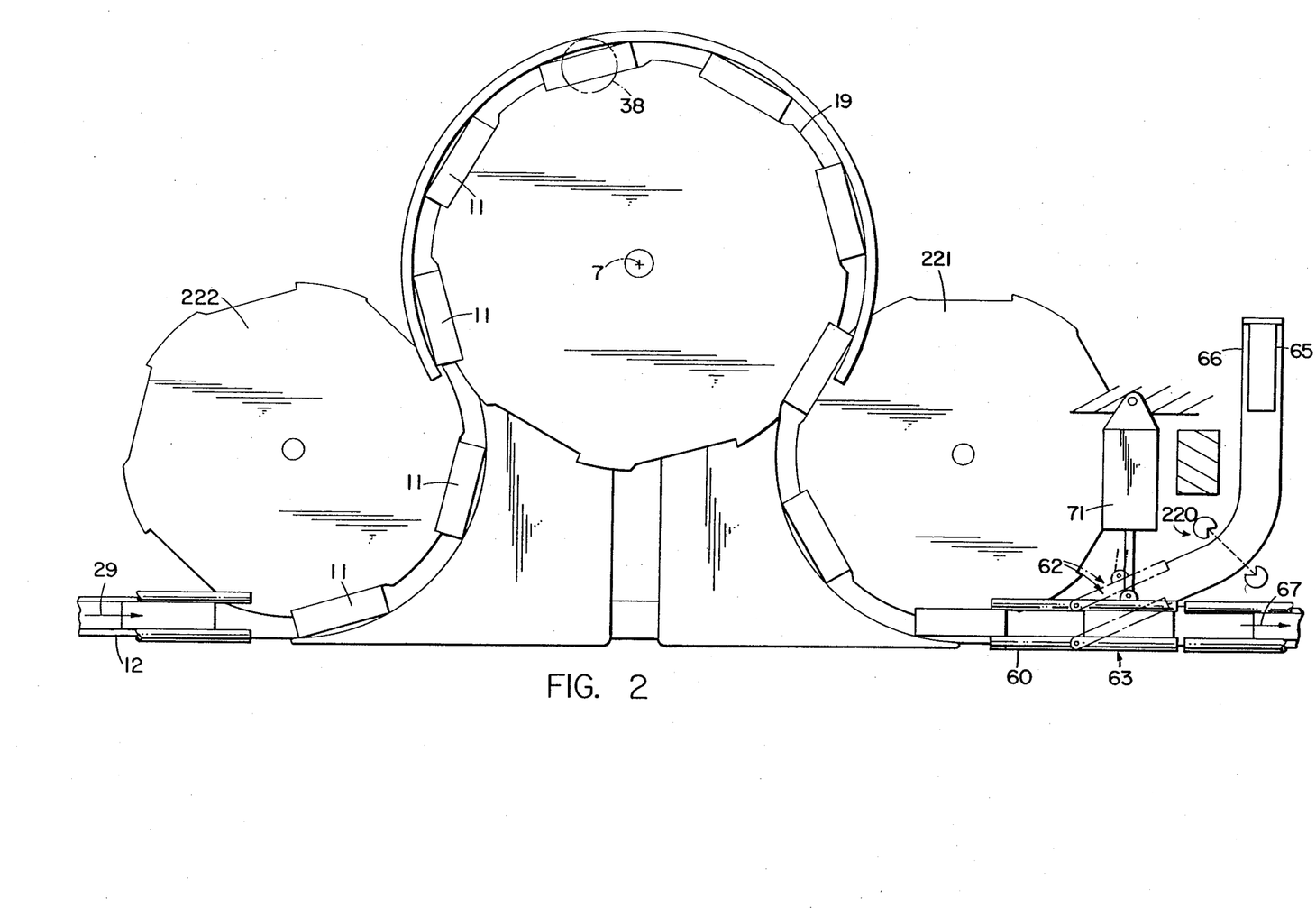
FIG. 2 is a top view of the starwheel assembly and the package diverter within the system of FIG. 1 to reject packages at the exit of the starwheel.

After the product passes through the common discharge chute 38 and the nozzle, the product is deposited into one of the revolving chutes 21,21 of the rotary discharge packaging machine 15. The chute has a lower jaw portion which enters the top of one of the packages 11,11 while the jaw is closed, and then opens to spread the mouth of the package and permit product entrained in the chute to pass into the package. Next, as shown in FIGS. 1 and 2, the filled packages, pass from table 19 to rotatable starwheel assembly 221, which has pockets spaced about its perimeter for receiving the filled packages.

Located immediately at the exit of starwheel assembly 221 is a package diverter 62. The diverter 62 comprises a pivotal track section 63 and an associated actuator 71, and is normally positioned as shown by the solid lines so that uncontaminated, filled packages 11,11 proceed to a cartoning station (not shown) in the direction of an arrow 67 where the packages are sealed and prepared for shipping. Because the computer controller controls the movement of the table 19 and the starwheel assembly 221, the computer is able to determine when a contaminated package arrives at the diverter after the metal detector sends a metal detection signal to the computer. At the appropriate time, the computer pivots the track section 63 to the position shown in phantom lines to divert the contaminated package to another conveyor 66 which leads to a reject station 65. The rejected package may be discarded, or if possible, the metal object is removed and the package is carried to the sealing station. The system 10 optionally includes a photoelectric eye 220 (FIG. 2) which the computer monitors to check that each contaminated package has in fact been diverted by the diverter 62 to the reject conveyor.

Figure 3A:
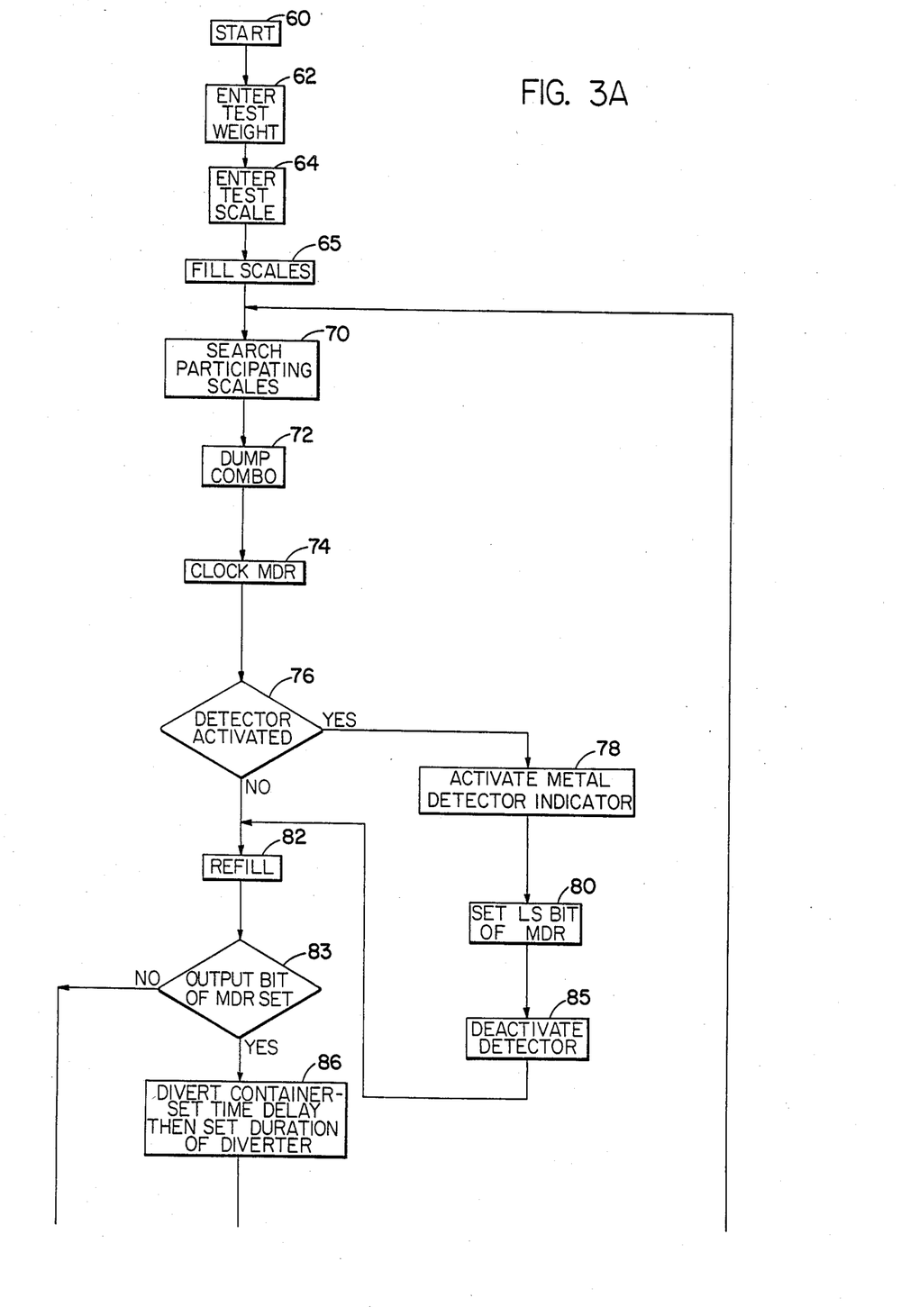
FIGS. 3(a) and 3(b) together constitute a flow chart illustrating a process for performing a metal detector test with the combination weighing and packaging system.
Figure 3B:
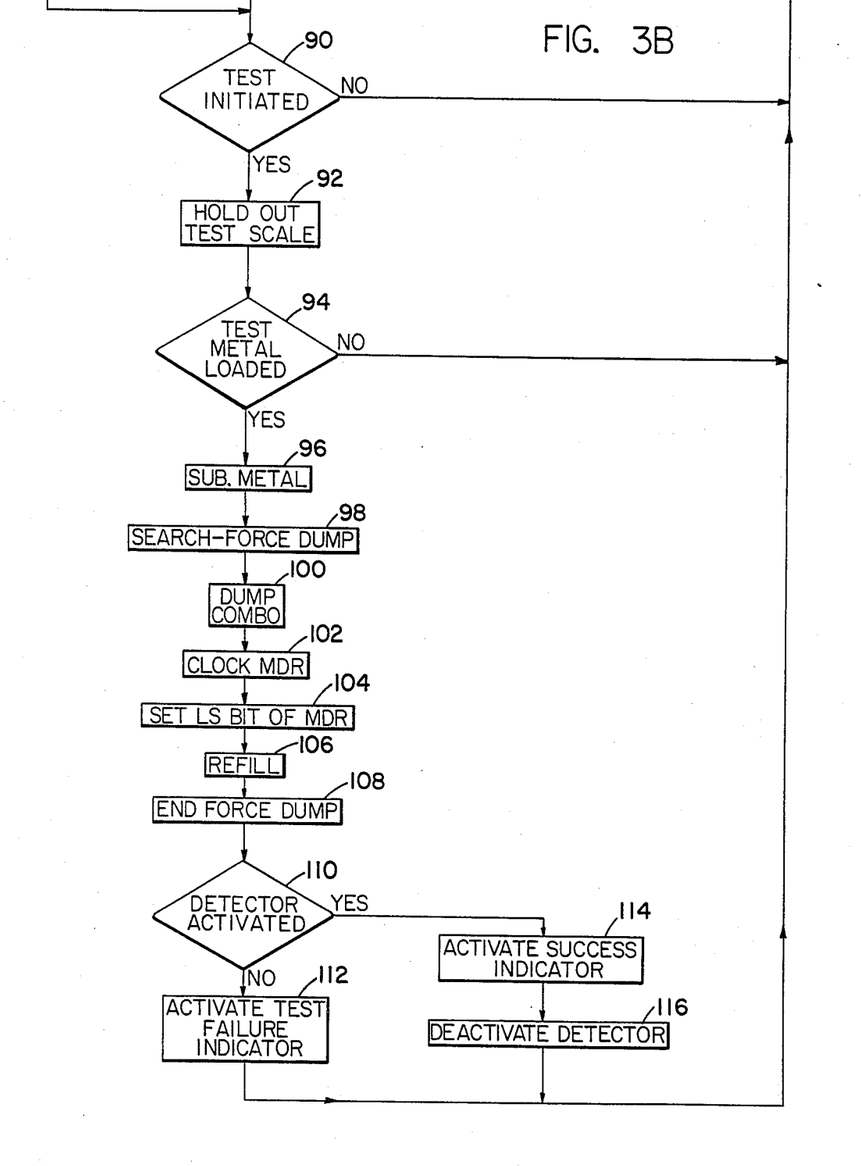

FIGS. 3(a) and 3(b) together constitute a flow chart illustrating a process by which the weighing and packaging system 10 continuously fills packages, diverts metal-contaminated packages to the reject conveyor 66 and performs a metal detector test operation without interrupting the packaging process. After the system 10 is started (step 60), an operator enters into the computer controller the weight of a metal test object (step 62). By way of example, the metal object may comprise a ball having a plastic exterior and a metal core 0.060 inch in diameter. Then, the operator enters into the computer the scale number which he or she will utilize for the testing operation (step 64) as discussed below. Then, the computer controller is activated to fill the weighing scales 47,47 with product (step 65) and institute a combination searching operation (step 70) of the participating scales. At this time, all of the scales are participating so that the computer controller searches all of them for the best combination.

After determining a suitable combination, the computer controller directs the selected scales to dump their product (step 72) into the common discharge chute 38 and also clocks a metal detector shift register (MDR) at step 74. The shift register serves as a delaying device. It ensures that if metal detector 18 indicates the presence of metal in a dumped batch, the computer controller will not actuate the package diverter until the contaminated package has reached the exit of the starwheel assembly 221. For example, the MDR shift register can have six stages, each stage corresponding to one of the six pockets in table 19 and starwheel 221 between chute 38 and the exit of the starwheel assembly (see FIG. 2). As the computer controller rotates the table 19 and advances the package by one pocket during each weighing and dump cycle, it also shifts each bit in the register, corresponding to a contaminated package, toward the output of the register. Thus, the register produces an output six cycles after metal is sensed by the detector.

The computer controller reads the output of the metal detector 18 (step 76) and if no metal has been detected during the dump, the computer directs the accumulator buckets located above the selected scales to refill the selected scales and also directs the product feed assembly 20 to refill the accumulator buckets (step 82). On the other hand, if the metal detector indicated the presence of metal in the dumped batch, the computer activates the metal detector indicator 23 which may produce an audible or visual signal (step 78), and sets the least significant bit of the MDR (Step 80). The computer controller then deactivates the metal detector (step 85), and, as noted above, causes the selected scales to be refilled (step 82).

Next, the computer controller checks the most significant bit or output bit of the MDR (Step 83). This bit corresponds to the package located in the pocket directly at the exit of starwheel assembly 221. If this bit was set to a one state to indicate contamination (step 80), then the computer controller activates both a delay timer and a duration timer (step 86) so that the contaminated package may be diverted to reject station 65. The delay timer ensures that the contaminated package has had sufficient time to enter the diverter before it is actuated, and the duration time is the time the diverter is in the divert position.

After diverting a contaminated package (step 86), or, if the computer controller found that there was no contamination in the first place (step 83), the computer reads a keyboard input 89 (FIG. 1) of the computer controller 16 to determine whether an operator has initiated a metal detection test (step 90).

If the operator has not initiated a metal detector test operation, the computer controller returns to step 70 and repeats the aforesaid weighing and packaging operation (steps 70-88). If the operator has in fact initiated a metal detector test operation by making a suitable entry into the computer controller (step 90), which test operations may be initiated approximately once per hour, the computer holds out the test scale from subsequent combination searches so that the test scale remains loaded with product and temporarily idle (step 92). Next, the computer controller checks whether the operator has indicated through the keyboard 8 that he has deposited the metal test object in the test scale (step 94). Because the computer performs the check in step 94 a short time after executing step 92, the test object will not have been placed in the test scale during the initial pass-through. Consequently, the computer controller returns to the step 70 and performs additional weighing and packaging operations with virtually no delay. Meanwhile, the operator manually deposits the test object in the test scale while the computer controller continues to loop through the steps 70-94 and fill additional packages 11,11. Finally, the operator returns to the computer controller 16 and makes an entry on the keyboard 8 indicating that the metal test object has been deposited in the test scale. Then, the next time that the computer controller reaches the step 94, the computer controller proceeds to subtract the weight of the test object from the total measured weight, including the product and test object, in the test scale (step 96) and then, searches all of the scales 17,17 for the best combination with the condition that the test scale be included in that combination. By way of example, to perform this type of search where one scale is mandated or forced to be included in the selected combination, the computer controller may initially subtract the weight of the regular product in the test scale from the target weight and then search the remaining scales for a combination which equals or slightly exceeds the differential target weight (step 98).

Next, the computer controller causes the selected scales including the test scale to dump the product and the test object into the common discharge chute 38 (step 100), clocks the metal detector register (step 102) and sets the least significant bit of the register (step 104). Then, the computer directs the product feed assembly to refill the selected scales (step 106), ends the forced dump arrangement of the test scale (step 108) while allowing the test scale to participate with the other scales in a subsequent search step and then senses the output of the metal detector (step 110). If the metal detector has in fact detected the metal test object, then the computer controller 16 displays on the monitor 9 a notation to that effect (step 114), deactivates the metal detector (step 116) and then returns to the step 70 to perform another searching operation. On the other hand, if the metal detector 18 did not detect the test metal object, the computer controller displays a test failure notation on the monitor (step 112) and then continues with the step 70.

It should be noted that whether the metal detector has detected the metal test object or not, the computer controller nevertheless sets the least significant bit of the MDR (step 104), and when the test package arrives at the diverter 62, the computer controller diverts the package to the reject conveyor (steps 83 and 86). There is no possibility, other than total system failure, that a package contaminated with the metal test object will be confused with the noncontaminated packages 11,11 and transported to the sealing station. Moreover, while the metal detector test operation (steps 96-116) caused one of the weighing scales 17 to be held out of several combination search operations, there was no interruption to the continuous weighing and packaging process. Also, because the metal test object was deposited into a weighing scale containing a batch of the regular product, the metal test object will proceed through the common discharge chute 38 and through the metal detector 18 in a manner which simulates that of a nontest metal object which inadvertently combines with the regular product within the weighing machine 14. Moreover, after the package 11 which has been contaminated with the metal test object is diverted to the reject conveyor, an operator may remove the metal test object from the package 11 and carry the package to the sealing station or place it on an empty portion of the conveyor downstream of the packaging machine 15 because the product in the package contains the target weight of the regular product.

Figure 5A:
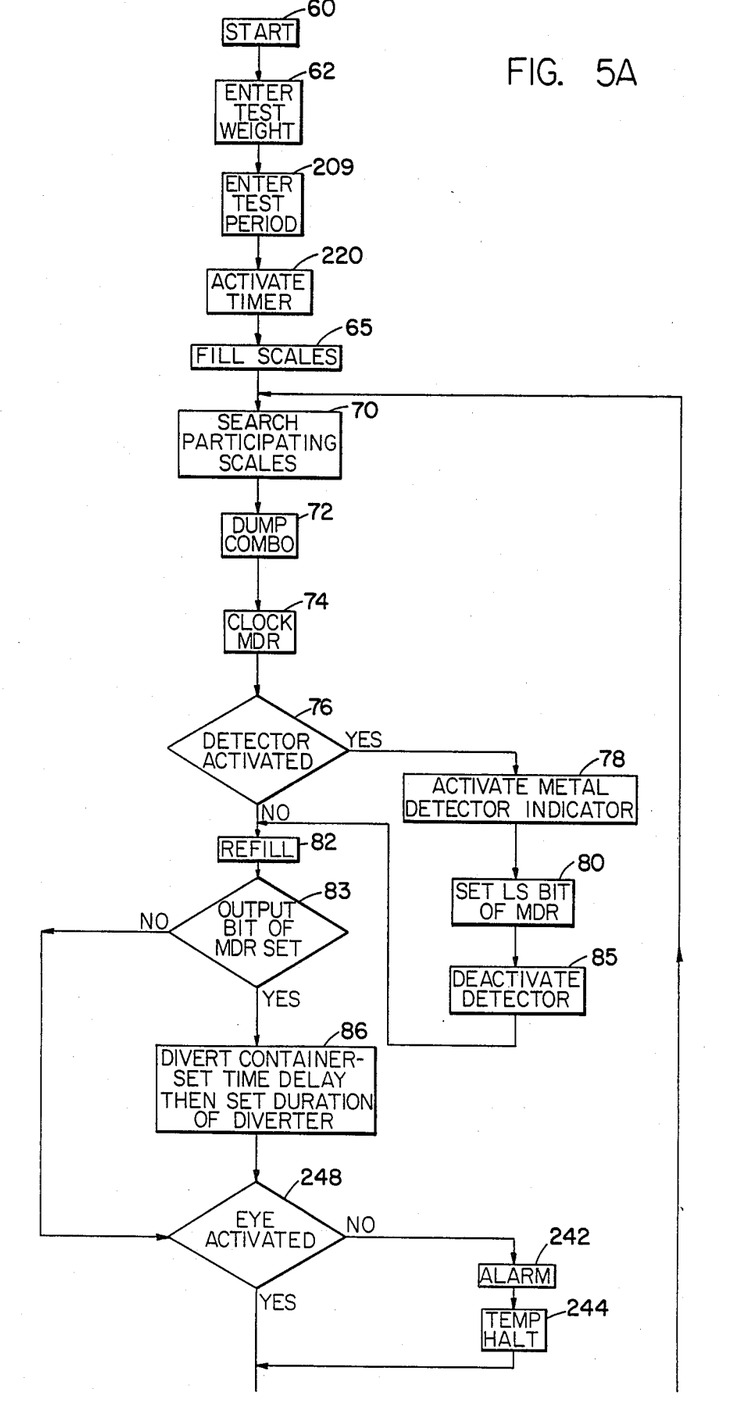
FIGS. 5(a) and 5(b) together constitute a flow chart illustrating a process for utilizing the combination weighing and packaging system and loader of FIG. 3 to perform a fully automatic metal detector test operation.
Figure 5B:
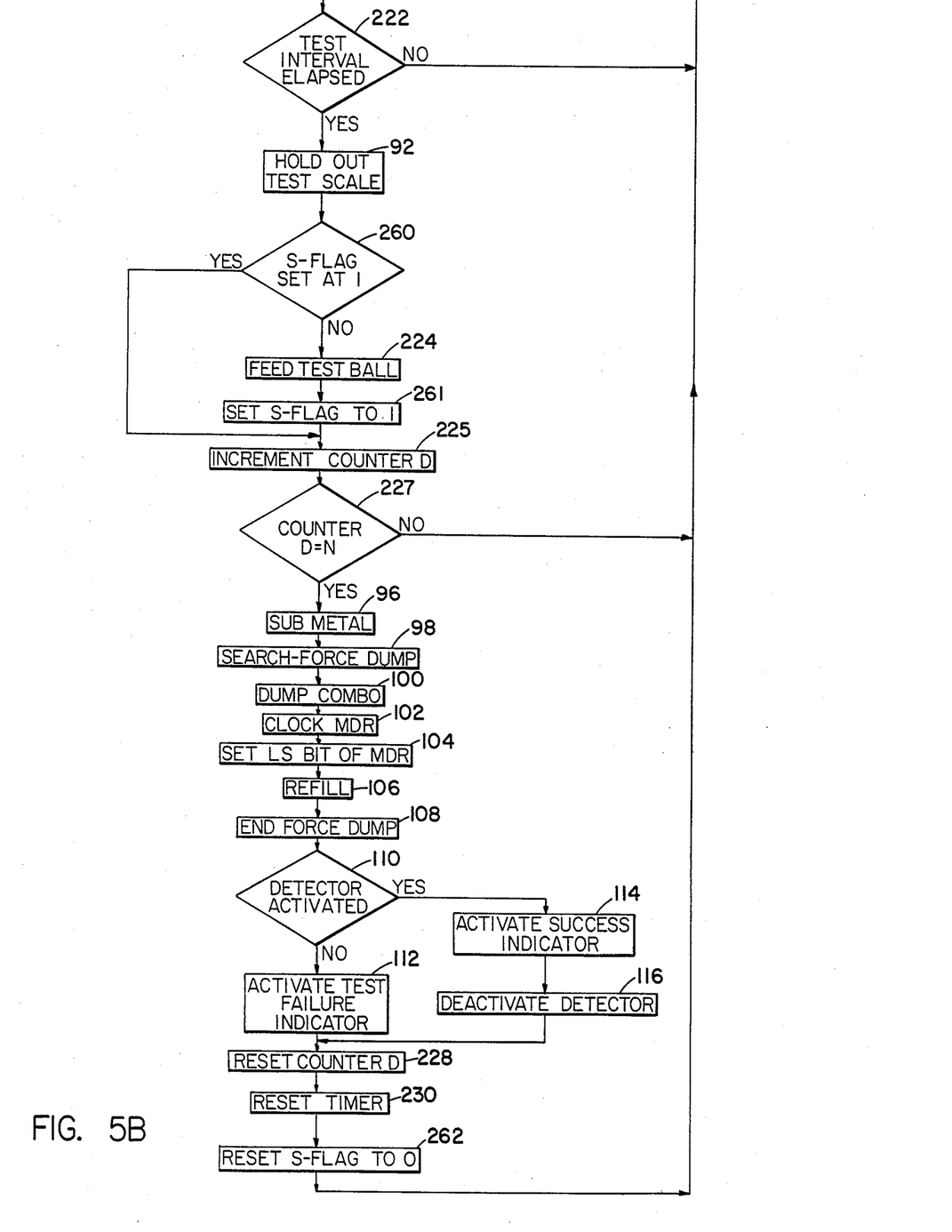

FIG. 4 is a fragmentary view of another combination weighing system generally designated 200 in which the invention is embodied. The system 200 is identical to the system 10 except that the system 200 includes a test metal feed mechanism 202 for automatically feeding metal test balls, one at a time to the test scale as directed by the computer controller 16. There are various types of feed mechanisms which may be utilized but the mechanism 202 comprise a conveyor belt 204 having pockets or receptacles 206 for holding the test balls 201,201. The feed mechanism 202 further comprises a stepping motor 208 under the control of the computer controller to periodically advance the conveyor belt 204 one unit length at a time to allow the receptacle closest to a discharge end 210 to drop a test ball 201 into a chute 212 which leads into the test scale. The system 200 also differs from the system 10 in its method of operation as illustrated by the flow chart of FIGS. 5(a) and 5(b). However, most of the steps of the flow chart of FIGS. 5(a) and 5(b) are identical to those of FIGS. 3(a) and 3(b) with like numbers indicating like steps.

After the system 200 is started (step 60), an operator enters the weight of the uniform test balls (step 62) and the test interval (step 209), activates a timer (step 220) and then the computer fills the accumulator buckets and scales with the regular product (step 65). There is no need for the operator to designate a test scale because the feed mechanism 202 always feeds the same scale 47 and the scale number can be preprogrammed. Next, the computer performs a multitude of combination weighing and packaging operations as described above (steps 70–86).

It should also be noted that whenever the contaminated test package or other contaminated package is diverted by the diverter 62 (step 86), the computer senses the photoelectric eye 220 (step 248) and if it acknowledges the presence of the contaminated package, the computer controller proceeds to step 222. However, if the photoelectric eye 220 is not so activated, the computer controller activates an audible alarm (step 242) and then halts the weighing and packaging operation for a predetermined time (step 244) to allow an operator to locate the contaminated package and if necessary, shut off the system 10 until suitable repairs can be made.

After each combination weighing and packaging operation (step 86), the computer reads the output of the timer (step 222). When it registers the test interval or greater, the computer initiates a metal detector test operation. Accordingly, the computer controller holds out the test scale as noted above (step 92) and with the S-Flag initially at zero (step 260), the computer controller activates the stepping motor 208 to advance the conveyor belt 204 one unit length to drop one of the test balls into the test scale (step 224). Then the computer controller sets the S-Flag to one (step 261) and increments a counter D to one (step 225), which counter serves a timing function as described below and then proceeds to read the output of the counter D (227). Assuming N is greater than one, for example, four, the computer controller loops back to the step 70 to perform another combination weighing and packaging operation. As programmed, the computer controller will perform N such combination weighing and packaging operations before the counter D reaches the count of N and the computer is ready to continue with the metal detector test operation. The reason that the computer waits N cycles is to allow time for the metal test ball to travel into the test scale and for the test scale to settle and no packaging time is wasted during this period.

Note that steps 260 and 261 prevent a test ball from being dropped each time the computer performs one of the N combination weighing and packaging operations so long as D<N, S-Flag is set to one (step 261). Thus, as the computer completes each of the N combination weighing and packaging cycles and determines that S-Flag is one (step 260), step 224 is omitted. The S-Flag remains in the 1-state until the metal detector test operation and packaging cycle is completed.

When the test ball has settled and count N is reached at 227, the computer performs the metal detector test operation in steps 96–116 as described above and then resets the counter D (step 228), the timer (step 230) and S-Flag to zero (step 262). Then, the computer loops back to the step 70 to continue the combination weighing and packaging operations as described above.

Another combination weighing system in which the invention is embodied is identical to the system 200 except that the feed mechanism 202 of the system feeds the accumulator bucket 52 instead of the weighing scale 47. Accordingly, the computer controller 16 is programmed to track the metal test object when the computer controller actuates the accumulator bucket 52 to dump the metal test object into the associated weighing scale.

Except for the additional step of dumping the metal test object from the accumulator bucket into the associated weighing scale and tracking it, the test process is similar to that illustrated in FIGS. 5(a) and 5(b).

Accordingly, combination weighing and packaging systems and related methods embodying the present invention have been disclosed. However, numerous substitutions and modifications may be made without deviating from the scope of the invention. For example, if desired, after the metal detector has been activated in response to a non-test piece of metal passing through it or after a test metal object has been discharged through the discharge chute 38, the system 10 can simply be halted to allow an operator to manually remove the contaminated package which is located beneath one of the discharge chutes.

Also, if desired, a vertical form fill and seal (VFFS) machine and a bifurcated conveying chute may substitute for the conveyor assembly 12. Filled and sealed packages are guided from the VFFS machine by the chute and if the metal detector indicates a contaminated package or if a test operation has just been performed, the computer controller 16 may be programmed to cause the contaminated package to be directed to the reject branch of the chute. Such diversion may be accomplished by the activation of a blower directed toward the diversion branch or by other means. The nonreject branch of the chute leads to a shipping station. In this latter embodiment utilizing the vertical form fill and seal machine, the weighing and packaging system may be shut down when a package is contaminated and an operator may manually remove the contaminated package.

In the combination weighing system 10, the metal test object may be deposited into the accumulator bucket 52 located above the test scale and after the test scale is utilized in a normal combination searching operation, the computer controller 16 can then direct the accumulator bucket 52 containing the test object to dump its charge of product and the test object into the test scale below. Next, the computer controller 16 performs another combination searching operation which includes the charge of product in the test scale as well as the other scales necessary to obtain the target weight (not including the weight of the test object). This procedure may be useful if there is too little room between the accumulator bucket and the test scale to insert the test object directly into the test scale. The steps 248,242 and 244 relating to the photoelectric eye may be included in the flow chart of FIGS. 3(a) and 3(b). Therefore, the present invention has been disclosed by way of illustration and not limitation.

I claim:

1. A process for testing a metal detector positioned to monitor product as the product passes through a common discharge chute of a cyclically operated combination weighing system, said weighing system comprising a plurality of weighing scales feeding said common discharge chute, said process comprising the steps of:
   depositing a metal test object in a first one of said weighing scales,
   searching said plurality of weighing scales while said first weighing scale contains said metal test object for a first selected combination of scales which includes said first scale and contains a combined quantity of product near a target weight,
   discharging the product and the metal test object from said first selected combination of scales into said common discharge chute, positioning a metal detector in the vicinity of the outlet of the discharge chute to detect metal in the product discharged by the first selected combination of scales; and
   monitoring said metal detector to determine whether it detects said metal test object discharged through said common discharge chute from said first weighing scale.

2. A process as set forth in claim 1 further comprising the step of:
   searching said plurality of weighing scales for a second combination which contains a combined quantity of product near to said target weight while excluding said first scale containing said metal test object from participating in the second search, and wherein
   the step of searching for said second combination is performed before the step of searching for said first combination.

3. A process as set forth in claim 1 further comprising the steps of:
   providing a computer to control the search operations of the combination weighing system, signaling the computer with a first signal before the step of depositing said test object in said first scale,
   causing the computer in response to the first signal to search said plurality of scales for a combination which excludes said first scale and contains a combined quantity of product near to said target weight,
   signaling the computer with a second signal after the step of depositing said test object in said first scale; and
   causing the computer in response to the second signal to perform said step of searching for a combination which includes said first scale.

4. A process as set forth in claim 3 further comprising the steps of:
   continuously performing additional combination searches of said plurality of scales which exclude said first scale between the first and second signals so that virtually no packaging time is wasted for depositing said test object in said first scale.

5. A process as set forth in claim 2 further comprising the steps of:
   directing each selected combination from the discharge chute of the combination weighing system into a respective package container in a series of package containers traveling along a conveying course,
   identifying a first package container in the series which contains said test object and the product of said first combination dumped through said discharge chute, and
   automatically diverting said first package to a reject course to segregate said first package from other packages and filled by said combination weighing system traveling on the conveying course.

6. A process for testing a metal detector positioned to monitor product as the product passes through a common discharge chute of a combination weighing system, said combination weighing system comprising a plurality of weighing scales feeding said common discharge chute, said process comprising the steps of:
   performing a first search of said plurality of scales for a first selected combination of scales which contains a combined quantity of product near a target weight, a first one of said scales being excluded from participation in said search, and correspondingly be excluded from the selected combination, dumping the first selected combination down the discharge chute,
   depositing an object containing metal into said first scale,
   performing a second search of said plurality of scales after said step of depositing to locate a second selected combination which includes the first scale and contains a combined quantity of product near to said target weight when the quantity of product in the first scale is included,
   dumping the second selected combination including the object and product of the first scale down the discharge chute, and
   noting the response of said metal detector to said object containing metal during the step of dumping the second selected combination.

7. A process as set forth in claim 6 wherein the step of performing a second search includes deducting the weight of the object containing metal from the weight of product measured in the first scale to establish the second selected combination near the target weight.

8. A process as set forth in claim 6 further comprising the steps of:
   conveying packages containing the selected combinations of product dumped through the discharge chute along a conveying course away from said discharge chute, and
   diverting the package containing said second selected combination including the metal object from said conveying course to separate said package from the other packages.

9. A process as set forth in claim 6 wherein the step of depositing said object containing metal into said first scale is performed automatically.

10. A process as set forth in claim 6 further comprising the steps of:
    performing additional combination searches of all of said plurality of scales to locate combined quantities of product near to a target weight without interruption after said first scale containing said metal object is dumped,
    conveying packages under said common discharge chute to receive respectively the product of said searches and said object containing metal, and automatically identifying said package containing said metal object among the conveyed packages without interrupting said additional combination searches.

11. In a combination weighing and packaging system having a plurality of weighing scales, a first computer means coupled to said weighing scales for determining combinations of said scales which contain a combined quantity of product near a target weight, a common discharge chute for said weighing scales, and a metal detector positioned to monitor product as it passes through said common discharge chute, the improvement comprising:
- second computer means programmable by an operator to initiate a metal detector test operation,
- third computer means responsive to the initiation of said metal detector test operation for holding a first of said scales out of at least one combination search performed by said first computer means after said metal detector test operation is initiated, and
- fourth computer means for forcing the first computer means to select a test combination which includes said first scale after a test object containing metal has been deposited in said first scale and said metal detector test operation has been initiated.

12. The improvement as set forth in claim 11 further comprising fifth means for monitoring said metal detector after said metal test object is discharged through said common discharge chute to determine if said metal detector was able to detect said metal test object.

13. The improvement as set forth in claim 11 further comprising:
- packaging means for conveying a first package under the discharge chute to receive the contents of said test combination of scales and other packages under the discharge chute to receive the contents of nontest combinations of scales which do not contain a metal object, and
- sixth means for distinguishing said first package which contains the product and said test object from said nontest packages containing product only.

14. The improvement as set forth in claim 13 wherein the sixth computer means includes seventh computer means for monitoring said metal detector and means for diverting said first package away from said nontest packages which do not contain a metal object.

15. The improvement as set forth in claim 11 wherein the fourth computer means includes fifth computer means for subtracting the weight of said test object from the measured weight in said first scale so that the weight of product alone in said test combination is near to said target weight.

16. In a combination weighing system having a plurality of weighing scales, a first computer means coupled to said weighing scales for searching for and determining combinations of said scales which contain a combined quantity of product near a target weight, a discharge chute for said weighing scales, and a metal detector kpositioned to monitor product as it passes through said discharge chute, the improvement comprising:
- second computer means for periodically initiating a metal detector test operation,
- third computer means responsive to the initiation of said metal detector test operation for holding a first one of said scales out of at least one combination search performed by said first computer means after said metal detector test operation is initiated, and
- fourth computer means for forcing the first computer means to select another combination which includes said first scale after a test object containing metal is deposited in said first scale and said metal detector test operation is initiated, and
- mechanical means responsive to said second computer means for automatically delivering said test object to said first scale after said test operation is initiated.

17. The improvement as set forth in claim 16 further comprising:
- means for discharging the contents of the scales of said other combination, and
- means for monitoring the response of said metal detector to the contents of the scales of said other combination including said test object containing metal.

18. The improvement as set forth in claim 17 wherein said mechanical means includes means for depositing said test object directly into said first scale.

19. The improvement as set forth in claim 17 wherein said mechanical means includes means for depositing said test object directly into an accumulator container of said combination weighing system feeding into said first scale and further comprising:
- fifth computer means for directing said accumulator container to discharge said test object into said first scale.

* * * * *